United States Patent [19]
Yoshino

[11] Patent Number: 5,160,229
[45] Date of Patent: Nov. 3, 1992

[54] MIST-SPOUTING TYPE DRILLING DEVICE

[76] Inventor: Yousuke Yoshino, 225, Oaza-terao, Kawagoe-shi, Saitama-ken, Japan, 356

[21] Appl. No.: 771,235

[22] Filed: Oct. 4, 1991

[30] Foreign Application Priority Data

Oct. 5, 1990 [JP] Japan .................. 2-266638

[51] Int. Cl.[5] .............................. B23B 51/06
[52] U.S. Cl. ............................ 408/59; 408/57
[58] Field of Search ............ 408/56, 57, 59; 279/20; 409/136

[56] References Cited

U.S. PATENT DOCUMENTS

| | | | |
|---|---|---|---|
| 1,807,126 | 5/1931 | Morrill et al. | 408/59 |
| 3,264,906 | 8/1966 | Swords | 408/59 |
| 3,487,748 | 1/1970 | Rage | 408/59 |
| 5,004,382 | 4/1991 | Yoshino | 408/204 |

FOREIGN PATENT DOCUMENTS 0252611 1/1988 European Pat. Off. .
60-201908 10/1985 Japan .

*Primary Examiner*—Daniel W. Howell
*Attorney, Agent, or Firm*—Wenderoth, Lind & Ponack

[57] ABSTRACT

In a mist-spouting type drilling device having a mist passage extending through a hollow drill and a hollow shaft, a slender throat nozzle is disposed inside the drill, and a slender anti-counterflow nozzle having an orifice portion is disposed inside the hollow nozzle. The anti-counterflow nozzle is connected to a mist supply pipe through a joint member having a seal. With the orifice portion placed midway of the mist passage nozzles, little atomized water introduced into the mist passage through the mist supply pipe flows backward and is prevented from leaking.

2 Claims, 4 Drawing Sheets

MIST-SPOUTING TYPE DRILLING DEVICE

BACKGROUND OF THE INVENTION

1. Field of the Invention

This invention relates to a device for drilling rigid materials such as a stone, ceramics and concrete, and more particularly to a mist-spouting type drilling device using water or atomized water as coolant which has a sealing structure at joint portions between a rotary drill and a coolant supply pipe.

2. Description of the Prior Art

For boring holes in a rigid workpiece such as a stone, concrete, porcelain tile, glass, metal and ceramics, there has been conventionally used a drilling device using water or atomized water as coolant as illustrated in FIG. 1 as one example. The conventional drilling device has a driving means mounted within a casing 1 and operated electrically or pneumatically to rotate a hollow shaft 3. To the leading end of the hollow shaft 3, there is connected a rotary drill 5 having an axial passage 5a and a cutting bit 7 formed of ultra-hard abrasive grains such as diamond grains. The cutting bit 7 has a spouting slit 7a communicating the axial passage 5a, through which water or atomized water is discharged. The water or atomized water used as the coolant for cooling the cutting bit 7 when drilling the rigid workpiece is introduced into the inside of the hollow shaft 3 and the axial passage 5a of the drill 5 through a mist supply pipe 9 connected to the rear end of the hollow shaft 3. Though the mist supply pipe 9 must be completely connected to the hollow shaft 3 so as to prevent the coolant from leaking, this is very difficult because the hollow shaft 3 rotates at a high speed relative to the mist supply pipe 9.

A connection structure between a lubricant mist supply pipe and a hollow shaft is seen in a drilling device proposed by Japanese Patent Application Public Disclosure SHO 60-201908. In this prior art drilling device, the rotary shaft to which a drill is connected by screwing has a radial hole open to a lubricant chamber formed between the hollow shaft and an outer cylindrical casing, so as to introduce a lubricant into the drill through the lubricant chamber and the radial hole in the drill. Though the lubricant chamber is sealed by rotary seal means, sealing is insufficient and the driving efficiency is reduced because the hollow shaft rotates at a high speed relative to the outer casing. Besides, since the radial hole formed in the hollow shaft is perpendicular to the axis of the shaft, the lubricant introduced into the lubricant chamber cannot smoothly enter the hollow shaft due to the centrifugal force caused by rotating the hollow shaft.

In another drilling device proposed by European Patent Publication No. 0,252,611(B1), a coolant mist supply pipe and a hollow shaft are connected to each other by butting. The butting connection of the mist supply pipe and hollow shaft fails to completely prevent the leakage of coolant flowing therethrough when the hollow shaft rotates at a high speed. Moreover, this structure has suffered a disadvantage that counterflow of the coolant flowing into a drill retained at the leading end of the hollow shaft is brought about easily, because the flowing resistance of the coolant which is produced in drilling is increased particularly when the cutting bit provided at the leading end of the drill moves deeply into a hole bored thereby. The counterflow of the coolant raises the pressure in the hollow shaft, thereby to easily give rise to leakage of coolant from the connecting portion between the hollow shaft and the mist supply pipe. The leakage of coolant inside the drilling device would contaminate the interior elements in the drilling device, entailing the risk of causing a leak of electricity.

Also, a drilling device proposed by U.S. Pat. No. 5,004,382 would entail the same problem. This prior art drilling device has coupling means for connecting a coolant mist supply pipe to a hollow shaft which is provided at the leading end thereof with a hollow drill. The coupling means consists of a rotary member having a circular groove and a stationary member having a circular projection which is fitted in the circular groove of the rotary member. Namely, the rotary and stationary members are in intimate face contact with each other so as to prevent leakage of coolant. As a result, the driving efficiency is remarkably reduced due to frictional resistance produced by the face contact of the rotary and stationary members. Furthermore, the problem of counterflow of the coolant as touched upon above still remains.

OBJECT AND SUMMARY OF THE INVENTION

This invention is made to eliminate the drawbacks suffered by the conventional drilling device as described above and has as an object to provide a mist-spouting type drilling device having sealing means capable of stably spouting atomized water from a cutting bit in drilling work without causing counterflow and leakage of the atomized water, which is excellent in performance and durability and will function during high-speed rotation of a drill.

To attain the object described above according to this invention, there is provided a mist-spouting type drilling device comprising a rotary drill having an axial mist passage and a cutting bit, a throat nozzle disposed in the mist passage, a hollow shaft detachably connected to the rotary drill and incorporating an anti-counterflow nozzle provided at its leading end with an orifice portion connected to the throat nozzle, and a mist-supply pipe connected to the anti-counterflow nozzle through a joint member having sealing means.

Atomized water supplied through the mist supply pipe into the anti-counterflow nozzle is introduced into the mist passage in the rotary drill through the orifice portion and spouted out from the cutting bit. The atomized water once introduced into the mist passage of the rotary drill is prevented from flowing backward by the orifice portion of the anti-counterflow nozzle even when drilling. Therefore, the atomized water can be stably applied to a cutting portion without leaking.

Since the joint member by which the mist supply pipe and anti-counterflow nozzle are connected incorporates the thrust bearing, it can sufficiently withstand a large thrust load when drilling a rigid material with a great force.

Other and further objects of this invention will become obvious upon an understanding of the illustrative embodiments about to be described or claimed in the appended claims, and various advantages not referred to herein will occur to one skilled in the art upon employment of the invention in practice.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
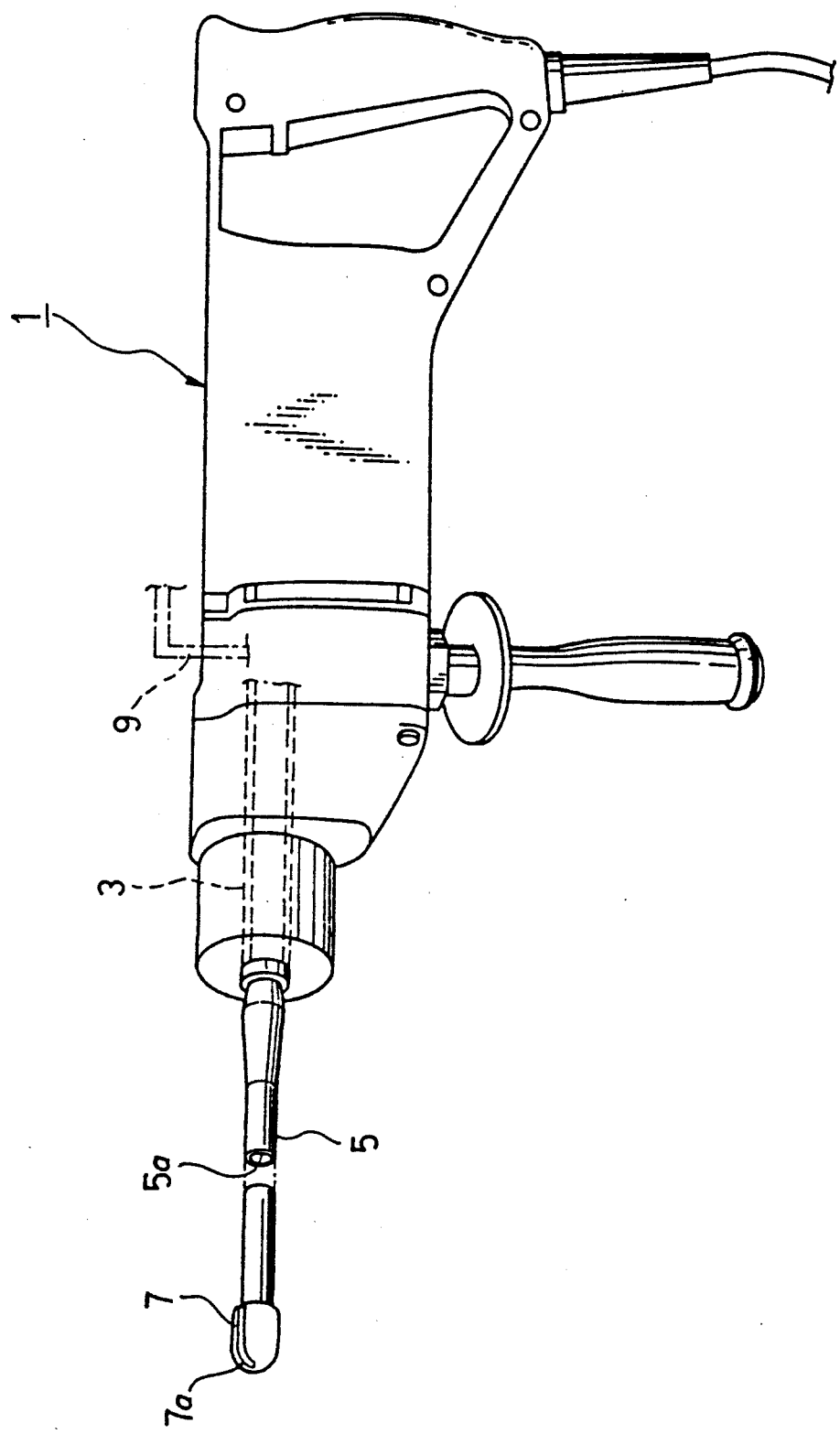
FIG. 1 is a perspective view showing a conventional drilling device.
Figure 2:
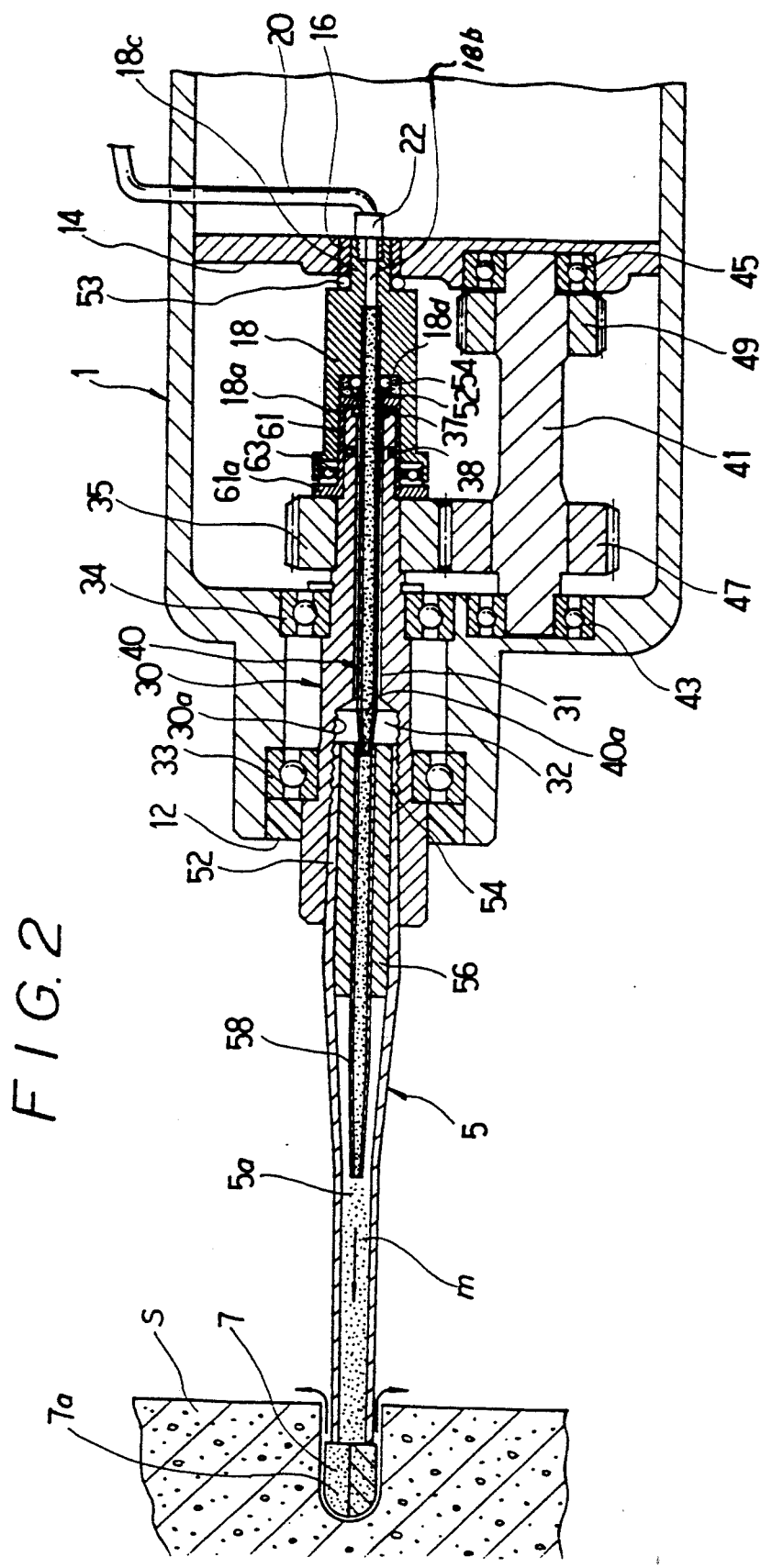
FIG. 2 is a sectional side view showing one embodiment of a drilling device according to this invention.
Figure 3:
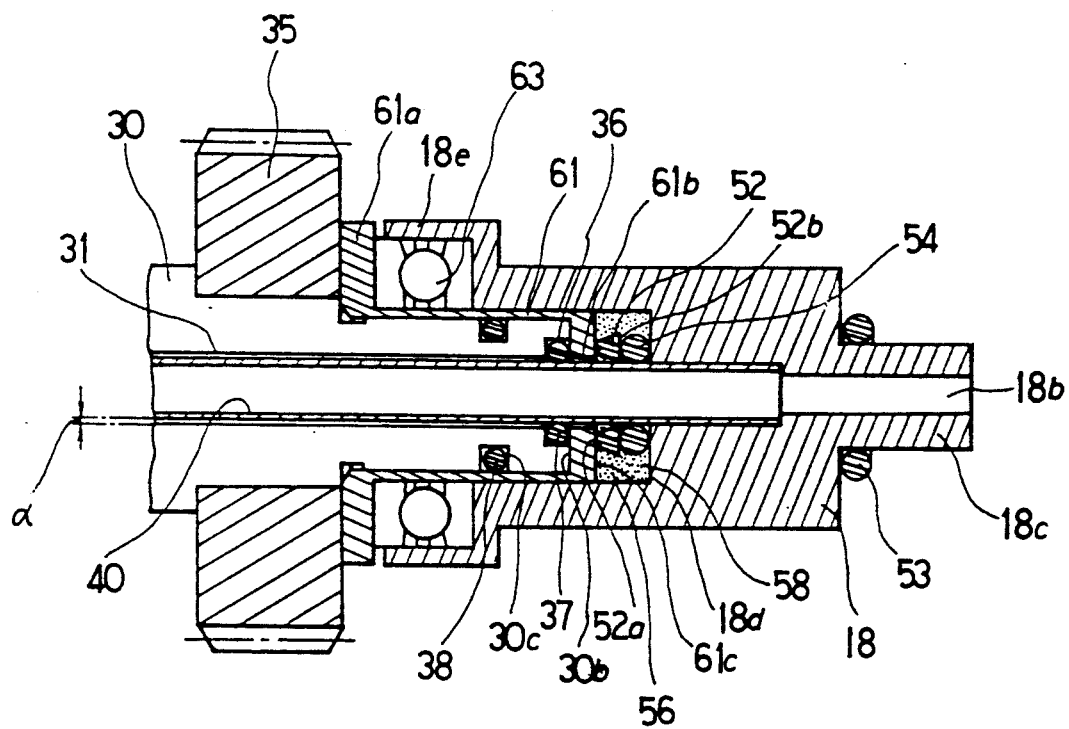
FIG. 3 is an enlarged sectional side view showing the sealing means in FIG. 2.
Figure 4:
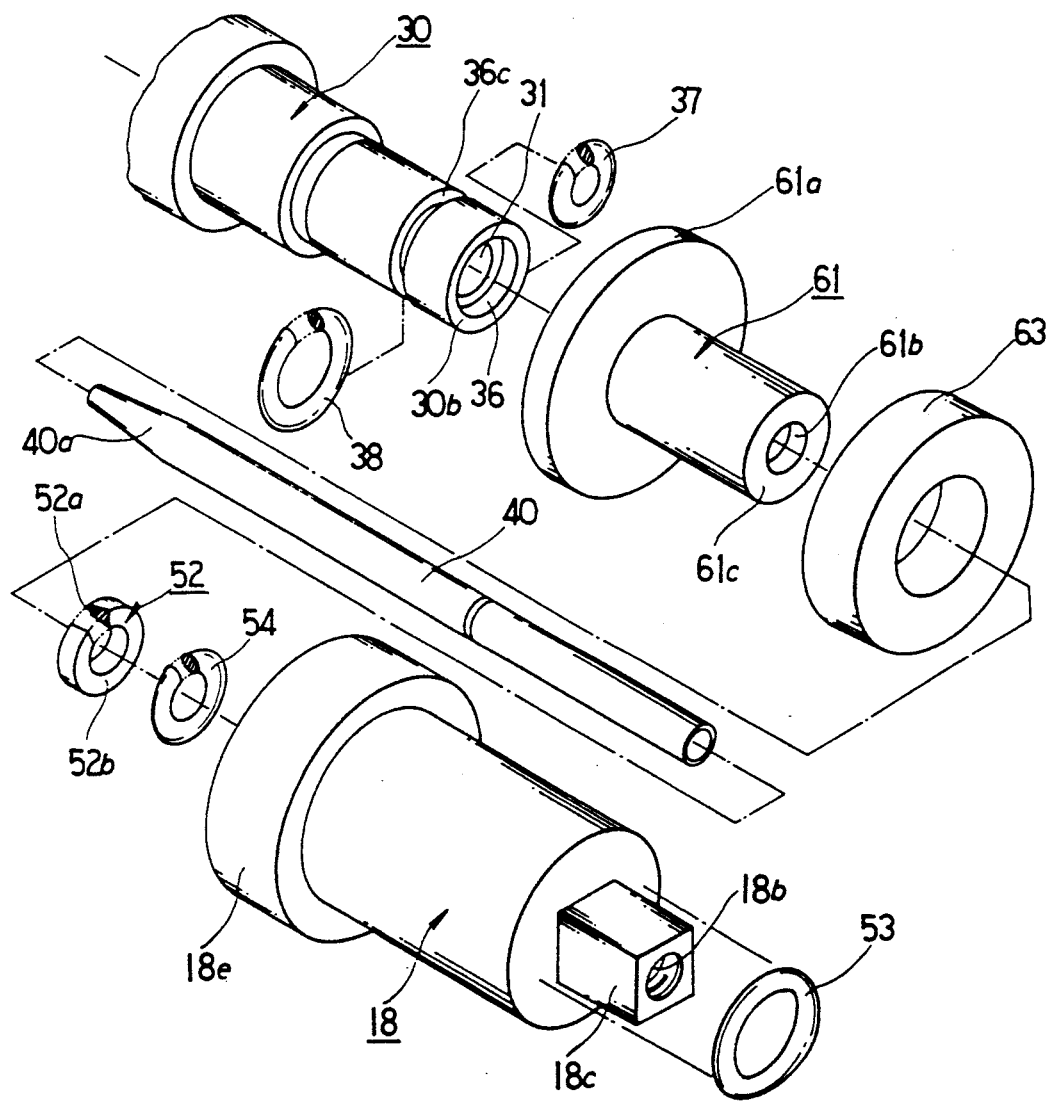
FIG. 4 is an exploded view of FIG. 3.

FIGS. 2 through 4 illustrate one embodiment of a mist-spouting type drilling device according to this invention. In these figures, the elements indicated by like reference numerals with respect of those of the prior art device shown in FIG. 1 mentioned above have analogous structures and functions to those of the prior art device and will not be described in detail again.

Inside a casing 1, there is disposed a hollow shaft 30 provided in the rear half portion thereof with an axial hole 31 having a relatively small inner diameter and in the front half portion thereof with an axial hole 32 having a relatively large inner diameter. The hollow shaft 30 is rotatably supported by radial ball bearings 33 and 38. Into the axial hole 31 of the hollow shaft 30, there is thrust a rotary drill 5 which has a mist passage 5a extending along the axis and is provided at its leading end with a cutting bit 7 made of ultrahard abrasive grains including diamond grains or the like.

Inside the mist passage 5a of the rotary drill 5, a slender throat nozzle 58 is retained by a supporter 56. The throat nozzle 58 has the leading end portion tapered.

The hollow shaft 30 incorporates a slender anti-counterflow nozzle 40 provided at its leading end with an orifice portion 40a.

The rotary drill 5 has a taper shank portion 52 with male thread means 54 which comes into threaded engagement with female thread means 30a formed in the axial hole 32 of the hollow shaft 30.

Between the front end portion of the casing 1 and the hollow shaft 30, there is disposed a sealing member 12 to prevent cutting chips produced in drilling from entering into the inside of the casing 1.

Within the casing 1, there is disposed a fixing wall 14 by which a joint member 18 is fixedly disposed through a collar 16. The joint member 18 is provided in the front half portion thereof with a fitting hole 18a into which the rear end portion of the hollow shaft 30 is fitted and in the rear half portion thereof with a mist conduit port 18b communicating with the fitting hole 18a. To the rear end of the joint member 18, there is connected a mist supply pipe 20 through which the atomized water m is supplied to the inside of the anti-counterflow nozzle 40. The rear end portion 18c is formed in a non-circular shape on the outside. In the drawings, reference numeral 22 denotes a connector for connecting the mist supply pipe to the joint member 18.

The rear end portion of the anti-counterflow nozzle 40 is fitted into the joint member 18, and the other portion of the nozzle 40 is inserted into the axial hole 31 of the hollow shaft 30. The anti-counterflow nozzle 40 is in contact with the throat nozzle 58 in such a state that the orifice portion 40a of the anti-counterflow nozzle 40 is partially inserted into the rear portion of the throat nozzle 58. A flow passage formed inside the nozzles 40 and 58 for introducing the atomized water is made narrow.

The hollow shaft 30 has a gear 35 meshed with a gear 47 disposed on a driving shaft 41 which is rotatably supported by bearings 43 and 45. The driving shaft 41 is rotated under power which is produced by a motor (not shown) incorporated in the casing 1 and transmitted to the shaft 41 through a gear 49, consequently to rotate the hollow shaft 30.

The atomized water m given from the mist supply pipe 20 flows through the flow passage formed inside the anti-counterflow nozzle 40, the throat nozzle 58 and the mist passage 5a of the drill 5 and is spouted out from the cutting bit 7. Thus, the atomized water flowing through the flow passage is little affected by the centrifugal force produced by the high speed rotation of the drill 5 and hollow shaft 30 owing to the narrow passage formed inside the nozzles 40 and 58. Therefore, the atomized water flowing at a high speed through the passage is prevented from vanishing due to dew condensation. Furthermore, since the atomized water flows through the orifice portion 40a placed midway of the flow passage inside the nozzles 40 and 58, the atomized water once introduced into the throat nozzle 58 is prevented from flowing backward into the inside of the anti-counterflow nozzle 40, even when the cutting bit 7 disposed at the leading end of the drill 5 enters deeply into a hole which is bored in a workpiece S thereby. Accordingly, the condition of the atomized water can be always maintained appropriately, so that the efficiency of cooling the cutting bit 7 can be enhanced, and the wear on the cutting bit can be reduced remarkably to lengthen the service life thereof.

The hollow shaft 30 is provided in the rear face portion 30b thereof with a dent 36 into which an O-ring seal 37 is inserted. The rear portion of the hollow shaft 30 is fitted in a cap member 61 having a flange 61a so as to prevent the O-ring seal 37 from falling out from the dent 36 of the hollow shaft 30. The cap member 61 has a hole 61b through which the anti-counterflow nozzle 40 is inserted.

Between the rear face 61c of the cap member 61 and the innermost face 18d of the joint member 18, there are disposed a seal member 52 and an O-ring seal 54 serving a spring function so as not to form a gap. Also, between the joint member 18 and the fixing wall 14, there is disposed an O-ring seal 53 so as not to form a gap therebetween.

The seal member 52 may be ma material having lubricating properties such as TEFLON and shaped in a truncated pyramid or a triangle in section so as to minimize the contact resistance produced by coming in contact with the cap member 61. In the space defined by the rear face of the cap member 61 and the innermost face 18d of the joint member 18 is contained a lubricant 58 such as grease to permit the cap member 61 with the hollow shaft 30 to be smoothly rotated and heighten the effect of sealing. It is desirable to use silicon grease as the lubricant 58 and further add powder of polytetrafluoroethylene to the grease.

Between the flange 61a of the cap member 61 and the skirt 18e of the joint member 18, a thrust bearing 63 is disposed to reduce the burden exerted excessively on the seal member 51 and the O-ring seal 53 in the thrust (axial) direction.

By the seal 37, the gap a between the outer surface of the anti-counterflow nozzle 40 and the inner surface of the hollow shaft 30 is sealed to prevent the leakage of the atomized water flowing through the nozzle 40. Thus, with the sealing structure as noted above, the mist passage from the mist supply pipe 20 to the leading end of the drill 5 is completely sealed. Besides, degradation of sealing effect during the course of prolonged service can be alleviated by means of the thrust bearing 63 and other sealing means.

As described above, according to this invention, since the passage or the atomized water formed in the hollow shaft and drill is made narrow, the atomized water can flow at a high speed, and dew condensation due to the centrifugal force caused by rotating the drill and hollow shaft can be prevented effectively. Furthermore, since the atomized water flows through the orifice portion placed midway of the flow passage inside the throat once introduced into the throat nozzle is prevented from nozzle, even when the cutting bit disposed at the leading of the drill enters deeply into a hole which is bored in the workpiece thereby. Therefore, the pressure in the flow passage in the hollow shaft is not increased excessively, consequently to avoid the possibility of occurrence of leakage which may involve leak of electricity inside the drilling device.

As many apparently widely different embodiments of this invention may be made without departing from the spirit and scope thereof, it is to be understood that the invention is not limited to the specific embodiments thereof except as defined in the appended claims.

What is claimed is:

1. A mist-spouting type drilling device comprising: a rotary drill having an axial mist passage and a cutting bit, nozzle disposed in said mist passage, a hollow shaft detachably connected to said rotary drill and incorporating an anti-counterflow nozzle provided at its leading end with a tapered orifice portion fitting into said throat nozzle, a mist-supply pipe for supplying atomized water, a joint member for connecting said mist-supply pipe to said anti-counterflow nozzle, and sealing means disposed between said joint member and said hollow shaft.

2. A mist-spouting type drilling device comprising: a rotary drill having an axial mist passage and a cutting bit, a throat nozzle supported in said mist passage by a supporter and having a leading end portion tapered, a hollow shaft detachably connected to said rotary drill and incorporating an anti-counterflow nozzle provided at its leading end with a tapered orifice portion fitting into into said throat nozzle, a mist-supply pipe for supplying atomized water, a joint member for connecting said mist-supply pipe to said anti-counterflow nozzle so as to introduce the atomized water into said anti-counterflow nozzle, and sealing means disposed between said joint member and said hollow shaft, said joint member having a cap member being in contact with said hollow shaft and being provided with thrust bearing disposed between said joint member and said cap member.

* * * * *